(12) United States Patent  
Salo

(10) Patent No.: US 7,706,396 B2
(45) Date of Patent: Apr. 27, 2010

(54) METHOD AND DEVICE FOR DATA TRANSFER IN TELECOMMUNICATION SYSTEM

(75) Inventor: Kaj Salo, Helsinki (FI)

(73) Assignee: ABB Oy, Helsinki (FI)

( * ) Notice: Subject to any disclaimer, the term of this patent is extended or adjusted under 35 U.S.C. 154(b) by 1304 days.

(21) Appl. No.: 10/853,528

(22) Filed: May 26, 2004

(65) Prior Publication Data

US 2004/0218619 A1  Nov. 4, 2004

Related U.S. Application Data

(63) Continuation of application No. PCT/FI02/01024, filed on Dec. 14, 2001.

(30) Foreign Application Priority Data

Dec. 14, 2001  (FI) ................................ 20012476

(51) Int. Cl.
  *H04J 3/16* (2006.01)
  *H04L 12/43* (2006.01)
(52) U.S. Cl. ........................................ 370/437; 370/459
(58) Field of Classification Search ................. 370/459, 370/460
  See application file for complete search history.

(56) References Cited

U.S. PATENT DOCUMENTS

| 4,429,383 | A | * | 1/1984 | Finck et al. ................. 370/433 |
| 4,471,481 | A | * | 9/1984 | Shaw et al. .................. 370/450 |
| 4,987,571 | A | * | 1/1991 | Haymond et al. ............ 370/445 |
| 5,163,047 | A | * | 11/1992 | Perdikaris et al. ............ 370/401 |
| 5,568,486 | A | | 10/1996 | Huscroft et al. |
| 5,590,172 | A | * | 12/1996 | Lodwig et al. ............... 455/436 |
| 5,654,969 | A | | 8/1997 | Wilhelmsson |
| 6,894,986 | B2 | * | 5/2005 | Matsumaru et al. ......... 370/257 |
| 6,963,580 | B2 | * | 11/2005 | Chien et al. .................. 370/445 |
| 7,133,396 | B1 | * | 11/2006 | Schmidl et al. .............. 370/347 |
| 7,245,604 | B2 | * | 7/2007 | Benveniste ................... 370/338 |
| 2002/0061031 | A1 | * | 5/2002 | Sugar et al. .................. 370/466 |
| 2006/0056453 | A1 | * | 3/2006 | Lindgren et al. ............. 370/468 |

FOREIGN PATENT DOCUMENTS

WO  99/13388  3/1999

* cited by examiner

*Primary Examiner*—Gregory B Sefcheck
(74) *Attorney, Agent, or Firm*—Adesh Bhargava; Timothy Sendek; Dykema Gossett PLLC

(57) ABSTRACT

A method and a device for transferring data in a telecommunication system comprising a data transfer path (8) and devices (21, 22, 1) using the data transfer path for data transfer, data being transferred cyclically in messages (4) between the devices according to at least one cycle having a cycle time, whereby the device (1) is configured to monitor the cyclic communication on the data transfer path; determine, on the basis of the monitoring and the cycle time of said at least one cycle of the cyclic communication, at least one expected occurrence time slot of the cyclic communication; and transmit a message not belonging to the cyclic communication to the data transfer path on the basis of at least one determined occurrence time slot such that it does not collide with one or more messages of the cyclic communication occurring in the determined at least one occurrence time slot.

15 Claims, 2 Drawing Sheets

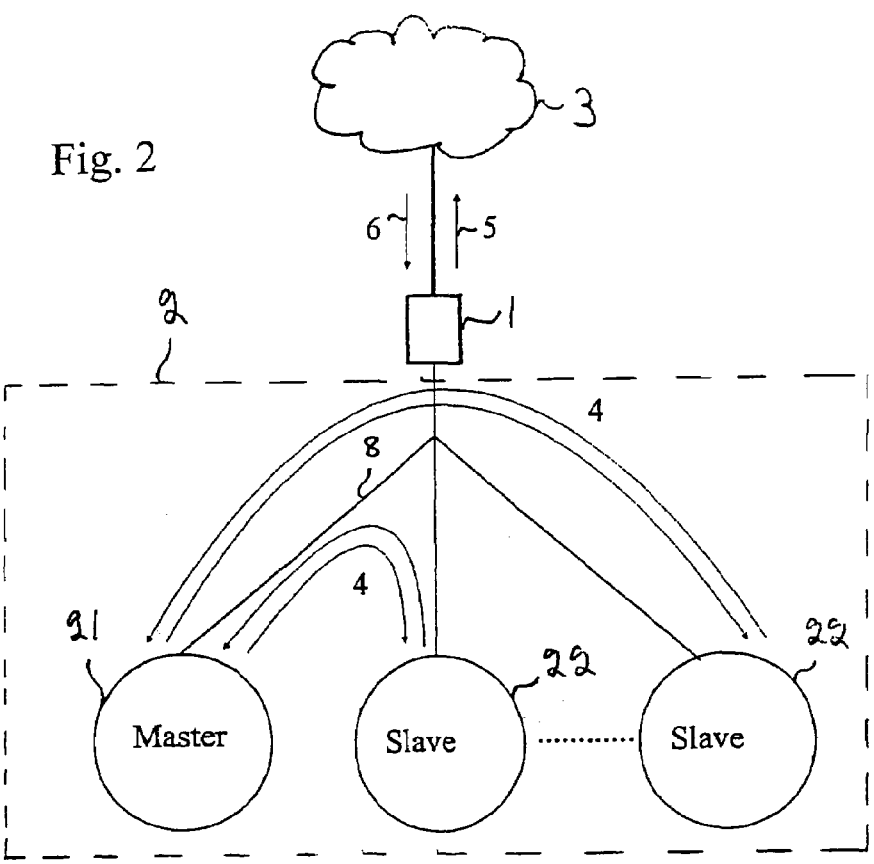
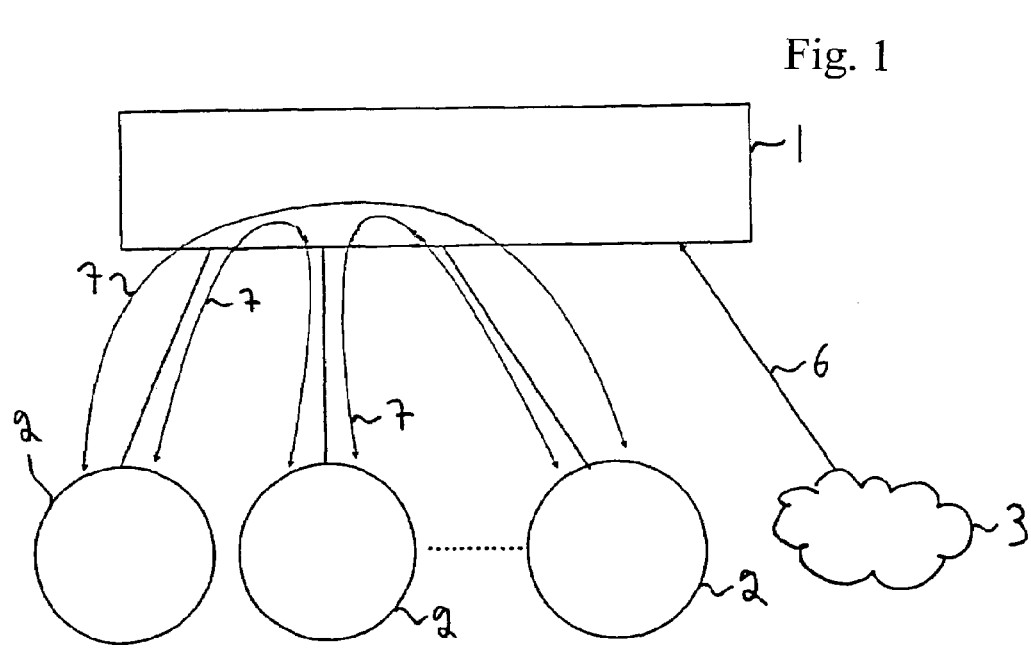

METHOD AND DEVICE FOR DATA TRANSFER IN TELECOMMUNICATION SYSTEM

CROSS-REFERENCE TO RELATED APPLICATION

This application is a continuation of PCT/FI02/01024, filed Dec. 14, 2001.

BACKGROUND OF THE INVENTION

The invention relates to a method and a device for data transfer in a telecommunication system, and particularly to data transfer in a telecommunication system wherein data is transferred cyclically.

An example of a telecommunication system wherein data transfer takes place cyclically in accordance with certain cycle times is a conventional factory automation system comprising a programmable logic controller (PLC or a so-called SoftPLC, which means replacing a programmable logic execution unit by an application program to be run in a computer for the execution of the commands issued by a logic program), related actuators and sensors or other devices, as well as a bus, e.g. a bus called Profibus or the like, connecting these. Typically, the internal telecommunication of such a system is cyclic such that the transmitter of data, e.g. a PLC, transmits a certain (the same) message at certain intervals in accordance with a corresponding cycle time, i.e. in other words a cycle time refers to the time between the starting moments of transmission of two such successive messages. A message is delivered to a device connected to the bus, and the device typically replies by transmitting a reply message. When the cycle time is short enough, data can thus be transferred practically in real time e.g. between a PLC and another actuator, in which case e.g. the real time status information or the like on the actuator is available to the PLC. There are usually several such cycles in progress simultaneously, each having a certain cycle time. The cycle times of different cycles may differ from each other or they may be equal in length. In addition, in such a system a message cycle is usually always started by a device operating as a master, such as a PLC, while the rest of the devices only reply to the messages supplied from the master device. In such a case, each message cycle has a predetermined transfer time on a data transfer path, thus enabling collisions between messages, i.e. simultaneous transmissions to a data transfer path, to be prevented.

Development of data transfer systems and the Internet, for example, have enabled e.g. different remote control systems to be implemented in a simpler manner such that an automation system connected to a general-purpose telecommunication network, such as an Ethernet network, can be monitored and controlled from a control system also connected to the particular network. Furthermore, if the Ethernet network or the like is connected to the Internet, the control system can be connected to the system to be controlled via the Internet.

A problem with the above-described system is how to connect a telecommunication system based on cyclic data transfer to a general-purpose telecommunication system wherein message communication is not based on any regular cycles but takes place as necessary and e.g. in dependence on the load situation in the network. If a message coming outside the system, e.g. via the Internet, is to be delivered to the telecommunication system based on the described cyclic data transfer, and such a message is transferred directly to the system, it is possible that the message may collide with a message of the cyclic communication since no time slot is reserved in the system based on cyclic data transfer for such a message coming from outside. Furthermore, the larger the number of such messages of random character coming from outside a deterministic telecommunication system based on cyclic data transfer and being delivered to the system, the larger the average number of collisions between messages coming from outside and internal cyclic messages of the telecommunication system, in which case the internal data transfer of the telecommunication system becomes increasingly disturbed.

A prior art solution to this problem is disclosed in published application WO 99/13388 which discloses a device for controlling the communication between two telecommunication networks. In the solution disclosed in the publication, a particular intermediation device (proxy device) controls messages supplied to a deterministic network within a certain quota such that it only lets in a certain number of messages during a certain time period. The transfer quota of a device is predetermined according to the load situation of the network.

The problem potentially relating to this prior art solution is, however, that the solution is based on the assumption that by distributing the communication coming from outside a deterministic network evenly within a certain quota, the disturbances caused by the communication coming from outside to the internal communication of the network can be minimized within a certain probability. Particularly when the load of the network is high, collisions may nevertheless occur disturbingly often since the transmission path of the network is highly loaded, meaning that not much free transfer time exists, and the messages differing from the cyclic communication and coming from outside to the transmission path do not necessarily meet the free time slots of the cyclic communication often enough.

BRIEF DESCRIPTION OF THE INVENTION

An object of the invention is thus to provide a method and an apparatus implementing the method so as to solve the above-mentioned problems or so as to at least alleviate the problems. The object of the invention is achieved by a method and a device which are characterized by what has been disclosed in the independent claims 1 and 8. Preferred embodiments of the invention are disclosed in the dependent claims.

The invention is based on monitoring cyclic communication on a transmission path of a telecommunication system and determining, on the basis of this and a cycle time or cycle times of the cyclic communication that in a normal state remain substantially constant, at least one or more expected occurrence time slots of the cyclic communication. A message not belonging to the cyclic communication, e.g. a message coming from outside the telecommunication system, can then, on the basis of the determined expected occurrence time slots of the cyclic communication, be transmitted to the data transfer path such that the message does not collide with one or more messages of the cyclic communication occurring in the determined occurrence time slots. During the normal state of the system, wherein the cycle times are substantially constant, the occurrence time slots of the cyclic communication can be determined in a highly reliable manner and thus interleave the rest of the communication with the cyclic communication.

An advantage of the method and system of the invention is that the invention enables communication not belonging to cyclic communication to be transferred on a transmission path used by cyclic communication such that the cyclic communication is disturbed as little as possible.

BRIEF DESCRIPTION OF THE DRAWINGS

The invention is now described in closer detail in connection with the preferred embodiments and with reference to the accompanying drawings, in which FIG. 1 is a block diagram showing a telecommunication system whereto the invention can be applied;

FIG. 2 is a block diagram showing a second telecommunication system whereto the invention can be applied;

DETAILED DESCRIPTION OF THE INVENTION

Figure 3:
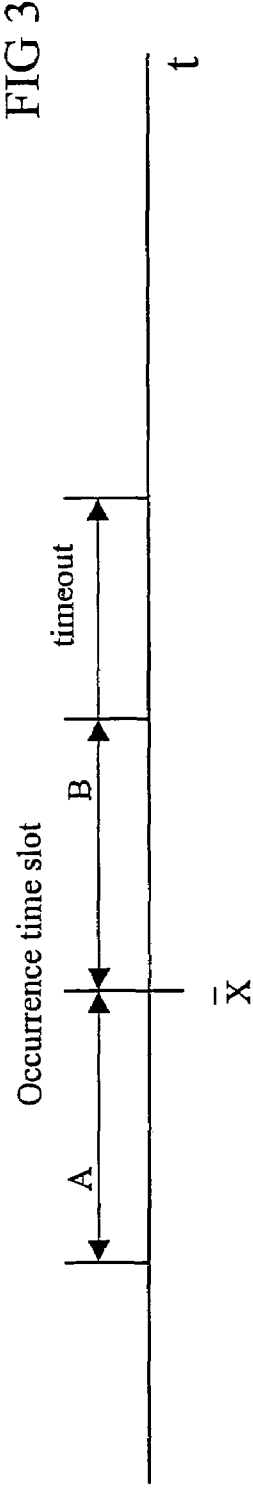
FIG. 3 is a diagram showing an occurrence time slot of a message in accordance with an embodiment of the invention.

FIG. 1 shows a telecommunication system comprising a telecommunication network 2, which is e.g. an automation system and which further comprises a master unit 21 and a number of slave units 22 connected to each other by means of a data transfer path 8. The data transfer path 8 may be a wired transmission path, e.g. a bus used in automation systems, or a wireless transmission path, such as a radio path. The master unit 21 is e.g. a programmable logic controller PLC and the slave units 22 are e.g. actuators and sensors or other devices connected thereto. The internal data transfer of the network 2, i.e. the data transfer between units 21 and 22, operates cyclically, in which case a message cycle 4 is always initiated by the master unit 21 while the rest of the units 22 only reply to the messages supplied from the master unit 21, as illustrated in the figures and as described already in the general part of the description. The internal data transfer of the network 2 thus takes place completely controlled by the master unit 21. Each message cycle 4 thus has a predetermined transfer time on the data transfer path 8 and thus collisions between different messages, i.e. simultaneous transmissions to the data transfer path, can be prevented. The network 2 is further connected to an intermediation device 1, which may be e.g. a router or a switch or another network device. Through the intermediation device 1 the network 2 is connected to other systems 3, such as other telecommunication networks, such as the Internet. The functionality of the invention is implemented at the intermediation device 1 and it is preferably implemented by software by means of a processor and suitable software or, alternatively, by separate components or circuits. If the device 1 is e.g. a router or a switch or a corresponding network device, the functionality of the invention may be added thereto e.g. in the form of a suitable software update. It is to be noted that the figures only show elements relevant to the understanding of the invention; the application of the invention is by no means restricted to the systems disclosed herein.

According to the basic idea of the invention, the intermediation device 1 monitors the internal communication 4 of the network 2 on the data transfer path 8. The intermediation device 1 also preferably analyses the communication and stores the analysis results obtained in its memory. Furthermore, the intermediation device 1 preferably monitors the realization of the obtained analysis results and corrects them if the communication changes, i.e. preferably, the communication is analysed continuously. Communication 6 coming from outside the network 2 is first buffered to the intermediation device 1. After noticing, on the basis of the analysis information, that a sufficient pause exists in the internal communication of the network 2, the intermediation device 1 transmits the message it has buffered to the data transfer path 8 of the network 2. Outgoing communication 5 from the network 2 can be forwarded immediately.

The internal communication of the network 2 is thus cyclic. It is transmitted e.g. by a process at the master unit 21. Normally, the process delivers the data to be transmitted to a protocol stack. Usually, a protocol stack also operates cyclically. Since the intermediation device 1 connected to the transmission path 8 hears all messages from the transmission path, it is possible to analyse mathematically e.g. the cycle times and occurrence moments of cyclic data on the transmission path.

A cycle time or cycle times of the internal communication of the network 2 can be supplied to the intermediation device 1 or, alternatively, the intermediation device may determine a cycle time or cycle times itself. If the cycle times are supplied to the intermediation device 1, it is preferably also provided e.g. with the cycle time of a protocol stack, if one exists. When the cycle times are supplied to the intermediation device 1, it does thus not have to carry out mathematical calculation in order to find out a cycle time or cycle times. The only matter subjected to mathematical analysis is then the anticipation of an occurrence time slot or occurrence time slots of the cyclic communication 4 in the bus 8.

When the intermediation device 1 is to determine the cycle times of the internal communication 4 itself, the cycle time of the operation of a possible protocol stack may also then be supplied to the intermediation device 1 (or information indicating that the protocol stack has no cycle time but the process using data transfer starts the protocol stack itself) or the intermediation device may also determine its cycle time itself.

When the intermediation device, by means of historical events, is to determine the cycle time of the data transfer of the internal communication itself, the following assumptions are preferably used:

A cycle time is usually no indefinite number, e.g. 29.38 ms, but typically an even round figure, such as 50 ms.

In a normal process situation, the cycle time does not change but remains substantially constant.

In a normal process situation, the system tries to settle in a stable state, i.e. changes occurring in the system are not continuous but such changes occur periodically. Such changes may occur e.g. when two different processes, the cycle time of the slower one of the processes being a multiple of the faster one, communicate to the outside world, in which case the mutual order between the messages transmitted by these processes in the bus 8 may change occasionally while the messages of the process having a slower cycle time may also be delayed from the anticipated cycle time. These phenomena do not, however, have any effect on the actual cycle time but on the occurrence moment of data in the bus 8.

A cycle time or cycle times are preferably determined such that the intermediation device 1 monitors the communication in the bus 8 and monitors each message cycle, simultaneously sampling the times between successive messages of each message cycle, i.e. more specifically, the times between the starting moments of successive messages. When a sufficient number of samples has been taken from a certain cycle, the mean value of the samples approaches the real cycle time of the particular cycle. Taking also the above-disclosed assumptions into account, the cycle time of the cycle can thus be found out. If several cycles are in progress, the cycle time of each cycle is preferably determined.

In calculating the cycle time of a protocol stack, if the intermediation device is to determine it, a message having the most frequent cycle is preferably used. Its standard deviation should be close to the cycle time of the protocol stack divided by two. The same usually applies to this time as to the cycle time of processes, i.e. it is a round number. It can also be inferred from the value obtained whether or not a protocol stack resides in its own process. If the value is small, the protocol stack does not reside in its own process. When the value is a real one, it is preferably rounded to the closest round number, e.g. 50 μs. If the value is not even close to any round number, more samples are taken and the calculation is repeated. The value obtained can be used for checking the calculations.

In the bus 8 of the cyclic communication 4, the predetermination of a coming occurrence time slot or slots can be based on the assumption that the occurrence moment of a message of a certain cycle from the previous occurrence follows a normal distribution. An alternative is to use the cycle time of a protocol stack, if one exists, as the range of variation. A variable x should, however, be added to this cycle time, the value of the variable x increasing as the number of faster cycle times increases.

Another alternative is to use normal estimators of a normal distribution:

$$Z = \frac{\overline{X} - \mu}{\sigma/\sqrt{n}} \sim N(0, 1), \quad (1)$$

wherein $\sigma = \sqrt{s^2}$, i.e. the square root of a sample variance,
$\overline{X}$ is the sample mean value, and
n is the sample size used.
The sample variance is obtained from the formula:

$$s^2 = \frac{1}{n-1}\left[\sum_{i=1}^{n} x_i^2 - \frac{i}{n}\left(\sum_{i=1}^{n} x_i\right)^2\right]. \quad (2)$$

$\overline{X}$, in turn, is obtained from the formula:

$$\overline{X} = (x_1 + x_2 + x_3 + \ldots + x_n)/n. \quad (3)$$

When the intermediation device 1 is given a probability P to use, a time slot can be calculated wherein the message of the cyclic communication should occur. After this time slot has started, i.e. after it has become active, preferably no outside messages 6 are allowed to enter the bus 8. After the message of the cyclic communication has passed, other messages may preferably be allowed to enter the bus. Therefore, the predetermined time slot of the message of the cyclic communication is preferably cancelled, i.e. it becomes nonactive, when the related message has passed in the bus, even though the time reserved for the time slot had not exhausted completely. The message of the outside communication can thus be allowed to enter the bus as soon as the time slot of the message of the cyclic communication is cancelled; or all the current active time slots are cancelled if the number of active time slots is larger than one. The prerequisite is thus that no time slot of the cyclic communication is active, i.e. transmission of the message not belonging to the cyclic communication to the bus 8 is preferably not started before the all the current active time slots of the cyclic communication are cancelled. In addition, the message not belonging to the cyclic communication is transmitted to the data transfer path 8 such that the transfer of the message on the data transfer path ends before the start of a next determined coming occurrence time slot of the cyclic communication. In some bus types, such timing of the transfer of a message before the start of the transfer of a next message may be a property of the bus 8 itself, which means that the intermediation device 1 may ignore it. The probability P is preferably selected such that when the volume of communication is small, a greater probability P can be used since free time for outside communication exists in any case. A greater probability P reduces the risk of collisions. When, on the other hand, the volume of communication is large, a smaller probability P must be used since not so many time slots are left to be used by outside communication. This increases the risk of collisions, though. Preferably, a suitable default value is used for the probability P, which can be changed, if necessary. An occurrence time slot μ can be calculated e.g. in the following manner:

$$\overline{X} - Z_?\sigma/\sqrt{n} - K \leq \mu \leq \overline{X} + Z_?\sigma/\sqrt{n} + \text{timeout} - K, \quad (4)$$

wherein $Z_?$ is the tabular value of a normal distribution of a given probability and ? is obtained from the formula:

$$? = 1 - (1-P)/2. \quad (5)$$

Figure 4:
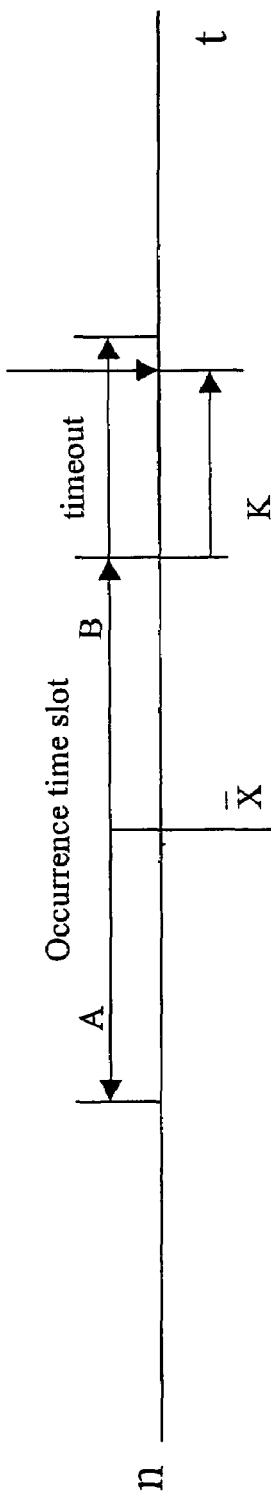
FIG. 4 is a diagram showing transfer of an occurrence time slot of a message in accordance with an embodiment of the invention.

In equation 4, the value timeout should be at least equal to the execution time of processes having higher priorities, multiplied by the number of executions that can be contained between the cycle of the process being processed. In FIG. 3, a time line is used for illustrating an occurrence time slot μ such that the left side of equation 4 is designated by the letter A while the right side without parameters timeout and K is designated by the letter B, the middle point thereof thus being $\overline{X}$. In addition, a timeout period is designated on the time line. The parameter K contained in equation 4 is a correction parameter which enables the realized occurrence moments to be taken into account and the deviations therein to be corrected compared with previous analysis results. K is the interval of a previous execution subtracted by a function of the time slot without timeout. In other words, if the execution slot does not meet the time slot A+B, the difference is subtracted preferably from the next expected occurrence time since the mean value of the execution intervals is usually within the range of a couple of decimals from the programmed one when the sample size is ten or more. When the occurrence moment of a message meets the time slot A+B, the value of K is, correspondingly, zero. This is illustrated in FIG. 4 which shows the occurrence of time slot n and the following time slot n+1 on two time lines. The time lines are aligned on top of each other such that the lower time line corresponds to the upper one added by the cycle time of the message under examination. The realized occurrence moment of the message is designated on the upper time line, which occurrence moment takes place in a timeout sequence. The value of K is the time between time slot A+B and the real occurrence moment of the message, as shown in the figure, and the next time slot n+1 correspondingly moves earlier by the magnitude of K.

Only one possible example has been disclosed above for determining a coming occurrence time slot or slots, but it is obvious that other kinds of methods can also be used without deviating from the basic idea of the invention.

FIG. 2 shows a second telecommunication system to which the invention can be applied. The system of FIG. 2 is otherwise similar to that of FIG. 1 but several networks 2 are connected to the intermediation device 1, the internal structure of each of the networks corresponding e.g. with the network 2 shown in closer detail in FIG. 1. In the following, these separate parallel networks 2 will be called sectors.

In the system of FIG. 2, the following properties may preferably be added to the intermediation device 1: transfer and mastering of the timing of a controlled sector 2. The transfer of timing of controlled sectors 2 enables communication 7 between the sectors 2 to be matched in such a way it does not disturb the internal communication of the controlled sectors 2. The mastering of the controlled sector 2 enables complexity of internal communication structure (multimaster) to be provided for the internal communication structure of the sector 2. Without mastering, in the system of FIG. 2 the intermediation device can be used for controlling master-slave communication, as described above in connection with FIG. 1. In such a case, the communication 7 between the controlled sectors 2 is processed in the intermediation device 1, as the communication 6 coming from elsewhere outside 3.

In the multimaster mode, also the communication 7 between the sectors can be processed as internal communication and only the communication 6 coming from outside the sectors is processed as outside communication, which is buffered to the intermediation device, as described above. The multimaster mode of the intermediation device can be implemented in the intermediation device 1 e.g. in the following manner: First, the intermediation device 1 device finds out the master units 21 from each sector 2 and the communication 4 thereof. Based on this, analysis data records are created on the communications. The analysis data records are updated on the basis of information on real, listened-to communication. In the multimaster mode, the intermediation device 1 gives the master unit 21 of each sector 2 its own communication time blocks to be followed by the devices. The intermediation device 1 may then, by monitoring the communications, ensure that the communication time blocks remain in place. If the monitoring result starts to slide too much, the intermediation device 1 gives a zero pulse and the master units 21 return to the original time blocks. Another alternative is that a timer or a network device gives each master unit 21 in turn a chance to carry out its own communications.

Information security properties, for example, may also be added to the intermediation device 1 since it is invisible to the transmission path. The invisibility of the intermediation device enables various communication filters to be built without enabling the properties of the filters to be modified by means of the communication to be delivered therethrough.

The invention may also be applied to different telecommunication systems based on a radio path. Bluetooth systems and WLAN (Wireless Local Area Network) systems based on IEEE 802.11 recommendation, for example, use partly the same 2.45 GHz frequency range. A Bluetooth system is typically intended for short, less than 10 m connections between devices. A WLAN system, on the other hand, is intended for providing a wireless local area network connection, and the connection distances the system enables may usually be dozens or hundreds of metres. These systems are often used in the same areas of use, either as separate systems or as a combination thereof. An example of a combination of the systems is an arrangement wherein a terminal device, via a Bluetooth link, communicates with a WLAN intermediation residing in the vicinity, e.g. in the same room, the WLAN intermediation, in turn, having a WLAN connection to a service provider residing farther away and providing e.g. an Internet connection. Since the Bluetooth and WLAN systems use a radio path partially having the same frequency, it may happen that they interfere with each other's communications. In such a case, the invention may be utilized e.g. in connection with the WLAN intermediation such that the WLAN intermediation analyses the cyclic communication of the Bluetooth system occurring on the radio path and matches its transmission of WLAN messages to the radio path in between the Bluetooth communication such that the Bluetooth and WLAN communications do not collide on the radio path.

It is obvious to one skilled in the art that as technology advances, the basic idea of the invention can be implemented in many different ways. The invention and its embodiments are thus not restricted to the above-described examples but may vary within the scope of the claims.

The invention claimed is:

1. A method of transferring data in a telecommunication system comprising a data transfer path and devices using the data transfer path for data transfer, data being transferred on the data transfer path cyclically in messages between the devices according to at least one cycle having a cycle time remaining substantially constant, wherein the cycle time of a cycle is a time between starting moments of transmissions, by the same transmitter, of two successive messages belonging to the cycle, the method comprising:

monitoring the cyclic communication on the data transfer path of the telecommunication system;

determining, on the basis of the monitoring and the cycle time of said at least one cycle of the cyclic communication, at least one expected occurrence time slot of the cyclic communication, wherein said determining comprises:

detecting, on the basis of the monitoring, one or more messages belonging to a particular cycle of the cyclic communication;

determining a realized occurrence moment of the detected one or more messages; and determining, on the basis of the realized occurrence moment of the detected one or more messages and the cycle time of that particular cycle, an occurrence time slot, which is expected at a predetermined probability, of at least one next message belonging to that particular cycle; and transmitting a message not belonging to the cyclic communication to the data transfer path on the basis of at least one determined occurrence time slot of the cyclic communication such that it does not collide with one or more messages of the cyclic communication occurring in the determined at least one occurrence time slot.

2. The method of claim 1, wherein the message not belonging to the cyclic communication is transmitted to the data transfer path such that the transfer of the message on the data transfer path ends before the start of the next determined coming occurrence time slot of the cyclic communication.

3. The method of claim 1 or 2, wherein the occurrence time slot determined for the next message of the cyclic communication is changed into non-active after the next message has passed on the data transfer path, the message not belonging to the cyclic communication being transmitted to the data transfer path such that the transmission of the message not belonging to the cyclic communication does not start before the current occurrence time slot of the cyclic communication becomes non-active.

4. The method of claim 1 or 2, wherein the occurrence time slots of the cyclic communication are determined for each cycle.

5. The method of claim 1 or 2, wherein the method further comprises:

determining, on the basis of the monitoring, the cycle time of said at least one cycle of the cyclic communication on the data transfer path of the telecommunication system prior to determining the occurrence time slots of the cyclic communication.

6. The method of claim 5, wherein the cycle time of the cycle is determined on the basis of the times between occurrence time slots of two or more detected messages belonging to the cycle.

7. A device for transferring data in a telecommunication system comprising a data transfer path and devices using the data transfer path for data transfer, data being transferred on the data transfer path cyclically in messages between the devices according to at least one cycle having a cycle time remaining substantially constant, wherein the cycle time of a cycle is a time between starting moments of transmissions, by the same transmitter, of two successive messages belonging to the cycle, the device comprising:
- means for monitoring the cyclic communication on the data transfer path of the telecommunication system;
- means for determining, on the basis of the monitoring and the cycle time of said at least one cycle of the cyclic communication, at least one expected occurrence time slot of the cyclic communication, said means for determining comprising:
- means for detecting, on the basis of the monitoring, one or more messages belonging to a particular cycle of the cyclic communication;
- means for determining a realized occurrence moment of the detected one or more messages; and
- means for determining, on the basis of the realized occurrence moment of detected one or more messages and the cycle time of that particular cycle, an occurrence time slot, which is expected at a predetermined probability, of at least one next message belonging to that particular cycle; and
- means for transmitting a message not belonging to the cyclic communication to the data transfer path on the basis of at least one determined occurrence time slot of the cyclic communication such that it does not collide with one or more messages of the cyclic communication occurring in the determined at least one occurrence time slot.

8. The device of claim 7, wherein the means for transmitting are configured to transmit the message not belonging to the cyclic communication to the data transfer path such that the transfer of the message on the data transfer path ends before the start of the next determined coming occurrence time slot of the cyclic communication.

9. The device of claim 7 or 8, wherein the occurrence time slot determined for the next message of the cyclic communication changes into non-active after the next message has passed on the data transfer path, and wherein the means for transmitting are configured to transmit the message not belonging to the cyclic communication to the data transfer path such that the transmission of the message not belonging to the cyclic communication does not start before the current occurrence time slot of the cyclic communication changes into non-active.

10. The device of claim 7 or 8, wherein the means for determining at least one expected occurrence time slot of the cyclic communication are further configured to determine the occurrence time slots of the cyclic communication for each cycle.

11. The device of claim 7 or 8, wherein the means for determining at least one expected occurrence time slot of the cyclic communication are further configured to determine, on the basis of the monitoring, the cycle time of said at least one cycle of the cyclic communication on the data transfer path of the telecommunication system prior to determining the occurrence time slots of the cyclic communication.

12. The device of claim 11, wherein the means for determining at least one expected occurrence time slot of the cyclic communication are further configured to determine the cycle time of the cycle on the basis of the times between occurrence time slots of two or more detected messages belonging to the cycle.

13. The device of claim 7 or 8, wherein the device is a router.

14. The device of claim 7 or 8, wherein the device is a switch.

15. The device of claim 7 or 8, wherein the data transfer path is a radio path and the device is a transceiver.

* * * * *

UNITED STATES PATENT AND TRADEMARK OFFICE
CERTIFICATE OF CORRECTION

PATENT NO. : 7,706,396 B2 Page 1 of 1
APPLICATION NO. : 10/853528
DATED : April 27, 2010
INVENTOR(S) : Kaj Salo It is certified that error appears in the above-identified patent and that said Letters Patent is hereby corrected as shown below:

Title page
Item (63), under the heading Related U.S. Application Data, "Dec. 14, 2001" should read
--Dec. 13, 2002--.

Signed and Sealed this

Seventh Day of September, 2010

David J. Kappos
*Director of the United States Patent and Trademark Office*